Oct. 14, 1930.　　　J. A. WILLIAMS　　　1,778,701
TRANSPLANTER
Filed April 2, 1929　　　2 Sheets-Sheet 2
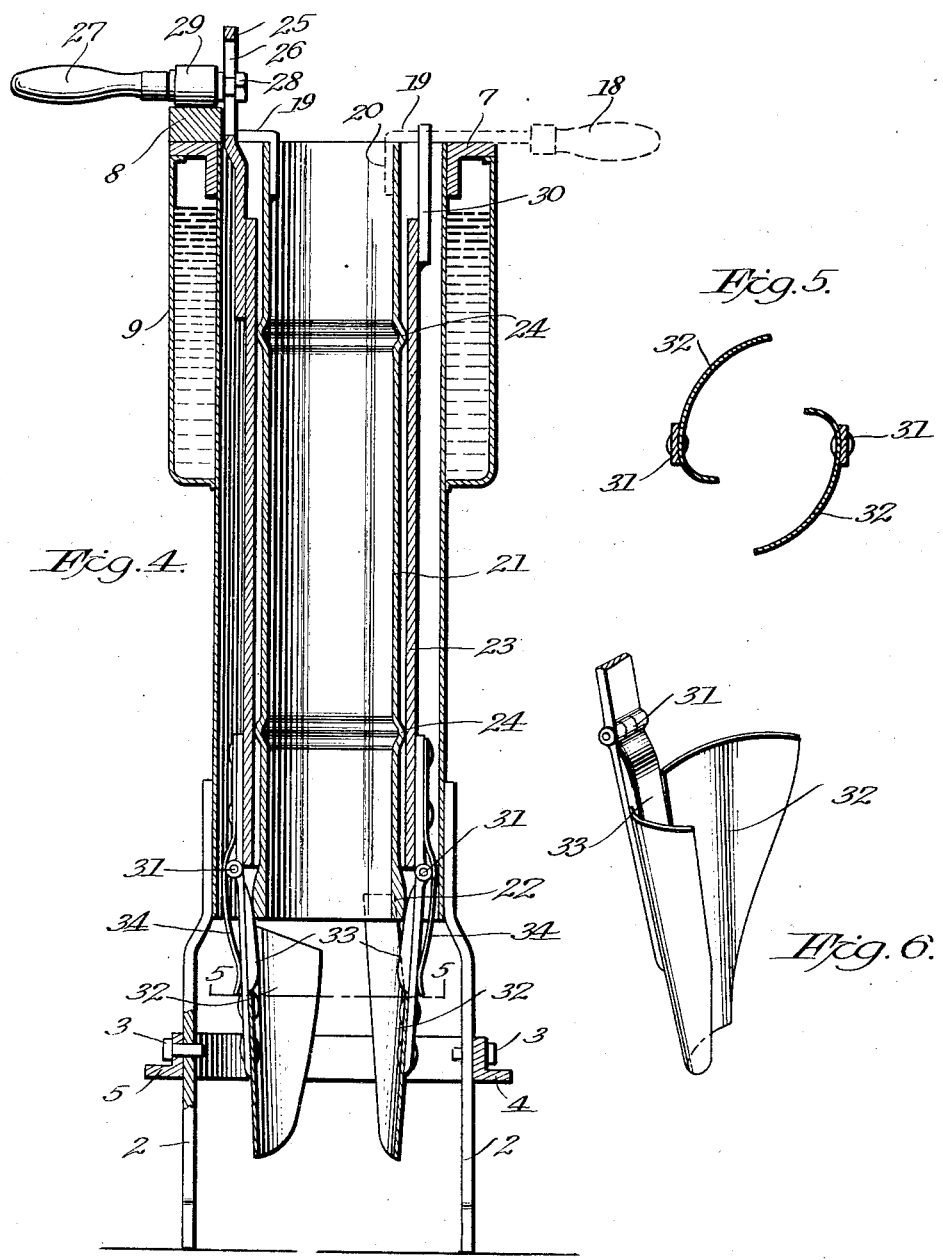
Inventor
Joseph H. Williams,
By Cushman, Bryant Darby
Attorneys Patented Oct. 14, 1930

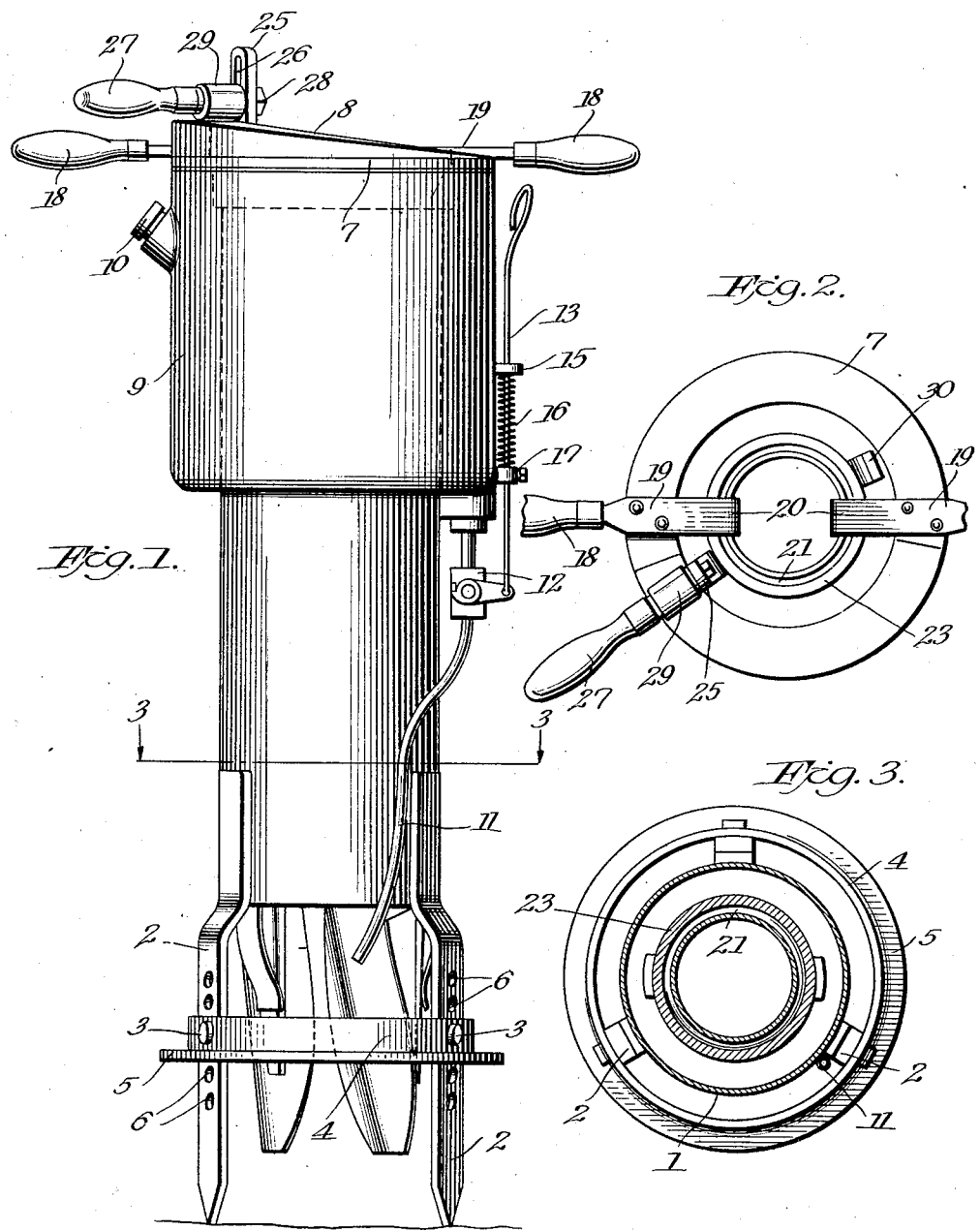

1,778,701

UNITED STATES PATENT OFFICE

JOSEPH A. WILLIAMS, OF ANGIER, NORTH CAROLINA

TRANSPLANTER

Application filed April 2, 1929. Serial No. 352,021.

This invention relates to transplanting devices to be used for plants such as tobacco, cabbage, sweet potatoes, tomatoes and the like, wherever it is customary to set out the young plants from hot beds.

Heretofore, in transplanting machines of this type, great difficulty has been experienced by reason of their inability to properly dig a hole, especially in hard earth, and then, when the plant is dropped therein, to correctly fill in the hole. Where the shovels simply attempt to gouge out the dirt, the operation is more often a failure than a success, resulting in a desire by the users to discard the device and revert to the old manual methods which are entirely too slow for efficient production.

The present invention overcomes this and other apparent difficulties in the old machines, and in operation performs its objective with such precision and efficiency as to make it indispensible wherever transplanting is done.

An object of the invention is to provide a transplanter which will perform all the necessary functions without need of prior or subsequent operations to that of the machine.

Another object of the invention is to provide a transplanter which can be easily and conveniently operated, thereby creating a desire to substitute it for manual methods, whereas, impractical devices are often discarded because they are cumbersome and inefficient.

Still another object of the invention is to provide a transplanter which is sturdy in construction, not liable to breakage or derangement, and which can be cheaply manufactured.

Further objects of the invention will appear in the following specification and accompanying drawings, wherein:

Figure 1 is a front elevation of the transplanter.

Figure 2 is a top view of the transplanter.

Figure 3 is a transverse sectional view on the line 3—3 of Fig. 1.

Figure 4 is a vertical longitudinal view partly in cross section of the barrel showing the operating mechanism.

Figure 5 is a cross-sectional, diagrammatic, view to show shovel operation.

Figure 6 is an enlarged perspective view of one of the shovels.

Referring more particularly to the drawings, 1 represents the tubular body or cylinder of the device, made of suitable metal which will withstand long use and not be too heavy. Near the lower end of this cylinder are attached, by any suitable means, legs 2, preferably three in number, around which is detachably secured by bolts 3 a circular band 4 having thereon a flange 5. Holes 6 are provided in the legs to allow adjustment of the circular band 4, the purpose of which is to form a stop when the legs have penetrated the earth to the correct depth for the desired operation of the machine.

Surrounding the cylinder at its top and attached thereto is a circular angle iron 7 to which is attached a semi-circular cam member 8, inclined from left to right when the operator is standing in position behind the machine.

Below the circular angle iron 7, and attached thereto at its top, is a cylindrical water tank 9, which extends partially down and entirely around the tubular member or cylinder 1. The tank 9 may be of any suitable shape and dimensions. Means for filling the tank is provided at 10, and a tube 11 extends downwardly from the tank to a point below and partially underneath the tubular member 1 to form an outlet for spraying the plants during the operation of transplanting. The end of the tube is placed in such a position as not to interfere with the shovels and yet deposit the water at the center of the plant and surrounding earth. A valve 12 controls the flow of water and has attached thereto an operating lever 13 held adjacent the side of the water tank by lug 15, and a spring 16 held to proper tension by adjustable lug 17, is provided to return the valve to a closed position.

Handles 18 are provided on either side of the machine for lifting and setting into position. They are attached to members 19 which are fastened on top of the angle iron 7 with their ends bent at right angles into the cylinder, as at 20.

Concentrically arranged within cylinder 1 and rigidly attached to members 20, is an inner tubular body or cylinder 21 of similar material to the outer tubular body or cylinder. It will be noted that the lower end of member 21 is thicker than the remaining part, as at 22. This is desirable in order to allow for the wear to which this portion is subjected.

Between the outer or inner tubular bodies or cylinders and closely surrounding the latter, is a third tubular body or cylinder 23, the length of which is somewhat less than the other cylindrical members. Ribs 24 are provided at the upper and lower ends of the inner cylindrical member which act as bearing surfaces for the frictional engagement of tubular member 23, thus eliminating unnecessary surface binding between the two cylinders 21 and 23. Rigidly secured to the upper end of the cylinder 23 is a vertical member 25 which protrudes above and is slightly offset toward the semi-circular inclined member 8. A slot 26 extends the length of this offset portion to receive the handle 27 adjustably secured by bolt 28.

The handle 27 is provided with a roller 29 which rides the semi-circular incline 8 when the machine is operated. The stop 30 prevents the cylinder 23 from turning, except for the correct distance.

Below the tubular bodies, and attached to cylinder 23 by hinges 31 are two shovels 32. It will be noted that the inner sides 33 of the hinge portions attached to the shovels are heavily constructed to co-ordinate with the portion 22 of cylinder 21 to prevent their being worn out by frictional engagement with each other.

Flat springs 34 are secured to the upper ends of the hinges, and press against the lower ends thereof to bring the shovels into closed position when out of engagement with the innermost cylinder.

In operation, the machine with handle 27 at the bottom of the incline, and the shovels thus in closed position, is inserted into the earth until the shoulder 5 of circular band 4 is flatly against the ground. The shovels having sharp edges will necessarily penetrate the earth to a predetermined depth and will dig the desired hole.

The plant is then dropped down through the center of the tubular members and held thereby in an upright position with the roots thereof properly positioned in the hole. Water is now sprayed into the hole.

The operating handle is then pulled up the incline, thereby lifting the cylinder 23, and at the same time imparting a twirling motion to the shovels, which will spread, due to their engagement with the lower end of the innermost cylinder. Because of the peculiar shape of the shovels, earth will be thrown into the hole to surround and firmly hold the roots of the plant. The amount of earth thrown into the hole will depend upon the rapidity with which the operating lever is pulled up the incline. If necessary, when the ground happens to be unusually hard, this operation can be repeated to insure a perfect setting of the plant.

The plant being thus firmly positioned, the operating lever should be left at the top of the incline which will cause the shovels to remain in an open position. The transplanter is then lifted from its position, and when the operating lever has been pushed down the incline, thereby closing the shovels, it is inserted into the ground by the operator at the next point of planting.

While the preferred form of the invention has been described, it is to be understood that the construction, combination and arrangement of parts may be changed by those skilled in the art without departing from the spirit of the invention as indicated by the appended claims.

I claim:

1. In a transplanting device, concentrically arranged tubular members, supporting legs attached thereto, means to predetermine the insertion of said supporting legs in the earth, shovels interposed below said tubular members, and means to impart a twirling motion to said shovels.

2. In a transplanting device, concentrically arranged tubular members, lifting handles attached to the tops thereof, shovels interposed between said tubular members, and means to impart a twirling motion to said shovels.

3. In a transplanting device, an outer tubular member, an inner tubular member rigidly secured therein, shovels interposed below, and means between said outer and inner tubular members to impart a twirling motion to said shovels.

4. In a transplanting device, an outer tubular member, an inner tubular member rigidly secured therein, a third tubular member interposed therebetween, shovels attached thereto, and means to impart a twirling motion to said shovels.

5. In a transplanting device, an outer tubular member, an inner tubular member rigidly secured therein, a third tubular member interposed therebetween, shovels hinged at the lower end thereof and means to impart a lifting and twirling motion to said shovels.

6. In a transplanting device, an outer tubular member, a substantially semi-circular inclined member attached adjacent the top thereof, an inner tubular member rigidly secured within the outer tubular member, the third tubular member interposed therebetween, shovels hinged at the lower end thereof and a handle secured to the upper end thereof to ride on said incline to impart a lifting and twirling motion to said shovels.

7. In a transplanting device, an outer tubular member, a substantially semi-circular incline member attached adjacent the top thereof, an inner tubular member rigidly secured within the outer tubular member, a third tubular member in frictional engagement at certain points therewith, shovels hinged at the lower end thereof and means to impart a lifting and twirling motion to said shovels.

8. In a transplanting device, an outer tubular member, a substantially semi-circular incline member attached adjacent the top thereof, an inner tubular member rigidly secured within the outer tubular member, a third tubular member in frictional engagement at certain points therewith, shovels hinged at the lower end thereof, and a handle adjustably secured at right angles to the upper end of the said third tubular member to ride said incline to impart a lifting and twirling motion to said shovels.

9. In a transplanting device, an outer tubular member, an inner tubular member rigidly secured therein, a third tubular member interposed therebetween, hinges secured thereto at their upper ends and to shovels at their lower ends, means to retain the shovels together in inoperative position, and means to impart a twirling motion to said shovels.

10. In a transplanting device, an outer tubular member, an inner tubular member rigidly secured therein, a third tubular member more heavily constructed near its lower end interposed therebetween, hinges secured thereto at their upper ends and to shovels at their lower ends, the said lower ends being provided with an inwardly extending abutment, springs secured to the upper portion of the hinges and pressing inwardly against the lower portions thereof, and means to impart a lifting and twirling motion to said shovels.

11. In a transplanting device, an outer tubular member, a cylindrical water tank surrounding and attached to the outer tubular member, an outlet tube leading therefrom to a point substantially below the center of said tubular member, a valve attached to said outlet tube, means to control said valve, an inner tubular member rigidly secured within the outer tubular member, a third tubular member more heavily constructed near its lower end interposed between the outer and inner tubular members, hinges secured thereto at their upper ends and to shovels at their lower ends, the said lower ends being provided with an inwardly extending abutment, springs secured to the upper portions of the hinges and pressing inwardly against the lower portions thereof, and means to impart a lifting and twirling motion to said shovels.

In testimony whereof I have hereunto set my hand.

JOSEPH A. WILLIAMS.